United States Patent Office 2,837,511
Patented June 3, 1958

2,837,511

ALKYLAMIDOMETHYL CELLULOSE MONO-ETHERS AND PROCESS OF MAKING SAME

Gerald J. Mantell, Newark, Del., assignor to E. I. du Pont de Nemours and Company, Wilmington, Del., a corporation of Delaware No Drawing. Application November 3, 1954
Serial No. 466,694

10 Claims. (Cl. 260—231)

This invention relates to a new class of cellulose ethers and more particularly to alkylamidomethyl cellulose ethers and to a process for the preparation thereof.

The formation of durable finishes on cellulosic fabrics has been the object of many investigations, most of which have sought to obtain durability by chemically linking the finishing agent to the cellulosic fabric, generally by ether and ester formations with the hydroxyl groups of the cellulose molecules. These durable finishes should be permanent as well as rendering the cellulosic fabric resistant to water, wrinkling and shrinking. The finishes must be applied without detrimental changes in other fabric properties such as tensile strength, crispness, abrasion resistance and hand.

This invention has as an object to provide a new class of alkylamidomethyl cellulose ethers. A further object is to provide cellulosic fabrics with durable finishes for imparting water-repellency, flame-resistance and other properties. A still further object is to provide a process for the preparation of this new class of alkylamidomethyl cellulose ethers by a Michael-type addition of active hydrogen compounds to cellulose ethers containing an activated carbon to carbon double bond. Other objects will appear hereinafter.

These and other objects are accomplished by the following invention of cellulose ethers of the type

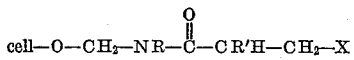

wherein R is selected from the group consisting of hydrogen and lower alkyl radicals; R' is selected from the group consisting of hydrogen and methyl radicals and X is the residue of an active hydrogen compound wherein the active hydrogen atom is linked to an atom selected from the group consisting of sulfur, nitrogen, phosphorus and oxygen and wherein the degree of substitution is between about 0.015 to 0.60. These cellulose ethers can be conveniently prepared by the reaction of cellulose ethers having the general formula

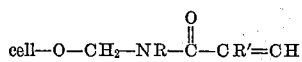

wherein R and R' are the radicals as defined above with an active hydrogen compound as defined above in the presence of an alkaline catalyst.

The term degree of substitution is used to denote the number of substituents per anhydro glucose unit. Since each unit contains three hydroxyl groups, the maximum degree of substitution would accordingly be three. A degree of substitution of between about 0.015 to 0.60 corresponds to a percentage substitution of hydroxyl groups of from 0.5% to 20%.

The cellulose ethers containing an activated carbon to carbon double bond used as starting materials for the cellulose derivatives of the present invention are more particularly disclosed in my copending application Serial No. 466,699, filed of even date herewith and assigned to the assignee of the present invention. These cellulose ether starting materials are prepared by reacting cellulose with certain N-alkylol acrylamides in the presence of an acid catalyst.

The active hydrogen compounds useful in preparing the cellulose derivatives of the present invention include hydrogen sulphide, mercaptans, ammonia, amines, phosphites and alcohols. Representative operable members of these groups of active hydrogen compounds are hydrogen sulphide, benzyl mercaptan and octadecyl mercaptan; ammonia, piperidine, octyl amine, morpholine, ethylene diamine, octadecylamines and commercial grades thereof and p-toluidine; diethyl phosphite, dibutyl phosphite and diphenyl phosphite; cellulose and aliphatic alcohols. The preferred active hydrogen compounds for purposes of the present invention are octadecyl mercaptan, octadecylamine and diethyl phosphite.

These active hydrogen compounds can be made to add to the activated carbon to carbon double bond of the cellulose ether by a Michael-type addition of active hydrogen compounds to a conjugated double bond, a well-known reaction. The addition of the active hydrogen compound to the conjugated double bond in the present invention is effected by suspending the cellulose ether containing the activated carbon to carbon double bond in a basic medium such as pyridine or aqueous alkali. This alkaline mixture is treated with the active hydrogen compound at temperatures between about 20° C. to 120° C. for a few minutes to several hours. The reaction mixture is usually extracted hot with a series of organic solvents such as pyridine or benzene, then alcohol or acetone to remove unreacted active hydrogen compound, and finally water-washed and dried. The reaction time is not critical since the time generally required for good yields depends upon the degree of agitation, the temperature and the reactivity of the active hydrogen compound.

The preferred catalysts are pyridine and aqueous alkali. Usually the catalyst is employed as a solvent so that it is present in large amounts. In any event it is necessary to use enough catalyst so as to render the reaction medium basic.

The following examples will better illustrate the nature of the present invention; however, it is to be understood that the invention is not intended to be limited to these examples.

EXAMPLE I.—*Addition of cellulose hydroxyls to the double bond of acrylamidomethyl cellulose ether*

When rayon challis fabric containing acrylamidomethyl groups (degree of substitution=0.12), which was prepared by immersing a rayon challis at room temperature in an aqueous pad bath solution which contained dissolved in it approximately 0.7% of ammonium chloride (acid catalyst) and N-methylolacrylamide in a concentration of 10%, was allowed to soak in 2% potassium hydroxide at room temperature, the cuprammonia-soluble cellulose derivative was rendered insoluble in less than 15 minutes. Microscopic examination showed that the insoluble fibers swelled to about two to three times their original size and that the swelling was not appreciably reduced after about one hour total soaking in the KOH solution. Not all of the double bonds are utilized in cross-linking and some are available for reaction with active hydrogen compounds in aqueous solution.

The extent of this reaction after two hours in aqueous potassium hydroxide has been determined by the addition of benzyl mercaptan which proceeds in nearly quantitative yield (Example II).

*Number acrylamidomethyl groups per hundred glucose units*

| Acrylamidomethyl Cellulose Ether Untreated Fabric | | Alkali Treated Cellulose Ether |
|---|---|---|
| By Nitrogen Anal. | By Mercaptan Reaction | By Mercaptan Reaction |
| 15 | 13 | 8 |
| 23 | 19 | 13 |
| 30 | 27 | 18 |

EXAMPLE II

A variety of active hydrogen compounds in pyridine solution were heated as described below with the methylolacrylamide treated rayon challis and with untreated rayon challis as controls. The extent of addition in all cases was determined by weight gain and in some cases was checked by analyses of the products for nitrogen, sulfur or phosphorus, depending on the nature of the adduct. The general equation for these reactions can be represented by

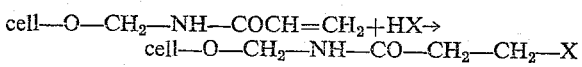

where HX is an active hydrogen compound. The reactions, with the exception of the hydrogen sulfide and piperidine additions were conducted at the temperature of boiling pyridine for 1 to 24 hours (as indicated below). All the active hydrogen compounds in pyridine were used as 15% to 20% solutions. After treatment, the fabrics were boiled with at least 3 portions of fresh pyridine, several portions of acetone and finally rinsed several times in water. Weight gains were determined on bone dry samples (dried at 110° C. for 1¼ hours). The data so obtained are summarized in the following table. They include corrections for changes in weight of control samples. The degrees of substitution were calculated from weight gains. The values in parentheses are degrees of substitution calculated from elemental analyses.

| Active Hydrogen Compound (HX) | Degree of Substitution By Acrylamidomethyl Group $-CH_2-NH-CO-CH_2=CH_2$ | Reaction Time (Hrs.) | Degree of Substitution By $-CH_2-NH-CO-CH_2-CH_2X$ Group | Extent of Addition, percent |
|---|---|---|---|---|
| hydrogen sulfide (bubbled in) | 0.11 | 1 (at reflux) then 20 (at room temp.). | 0.11 (.08) | 100 |
| benzyl mercaptan | 0.11 | 2.5 | 0.11 (.09) | 100 |
| Do | 0.32 | 2.5 | 0.24 (0.25) | 75 |
| octadecyl mercaptan | 0.13 | 10 | 0.010 | 7.7 |
| dioctadecyl+dihexadecyl amines. | 0.32 | 22 | 0.022 | 6.9 |
| diethyl phosphite | 0.31 | 0.75 | 0.059 | 19 |
| piperidine (no pyridine) | 0.15 | 3 | 0.080 | 53 |

The fabrics containing chemically linked dioctadecylamine and octadecyl sulfide groups are water repellent (spray ratings of 80) and the effect is not lost by boiling successively with pyridine, benzene, chloroform and ethanol. No reduction in spray rating was noted after a wash with aqueous solutions of sodium lauryl sulfate and of tallow soap plus sodium bicarbonate.

EXAMPLE III

Methylolacrylamide was padded onto rayon challis in the presence of ammonium chloride from a 30% solution of the amide in a 4:1 mixture of isopropanol and water, giving a final pick-up of about 6.5% after curing (dry wt., determined by weight gain). This fabric was treated with octadecylmercaptan and dioctadecylamine by the procedure of Example II, using 15% solutions in pyridine. The surprisingly good durable water-repellency imparted by relatively small numbers of long-chain substituents on the cellulose is shown by the following table:

| Hydrophobic Compound (HX) | Percent of Hydrophobic Compound on Fabric As Determined By Weight Gain | Spray test after— | |
|---|---|---|---|
| | | Solvent Extraction | Soap Wash |
| octadecyl mercaptan | 1.0 to 1.5 | 80 | 80 |
| octadecyl mercaptan | 1.5 to 2.0 | 80+ | 80+ |
| dioctadecyl amine | 0.1 to 0.5 | 80 | 70+ |

EXAMPLE IV

The acrylamidomethyl cellulose fabric was also shown to add ammonia and hydrogen sulfide (as sodium hydrosulfide) in aqueous solution. The reactions proceeded readily at or near room temperature with concentrated aqueous ammonium hydroxide and 12% sodium hydrosulfide solution as the sources of $NH_3$ and $H_2S$, respectively.

| Active Hydrogen Compound (HX) | Degree of Substitution by— | | Extent of Addition, percent |
|---|---|---|---|
| | $-CH_2NHCOCH=CH_2$ | $-CH_2NHCOCH_2CH_2X$ | |
| hydrogen sulfide | 0.10 | 0.10 | 100 |
| ammonia | 0.31 | 0.22 | 71 |

The fabric heated with hydrosulfide gave a positive test for —SH groups with sodium nitroprusside reagent whereas the control fabric showed a negative test.

EXAMPLE V

The reaction described in Example II with benzyl mercaptan was conducted in the same way using methacrylamidomethyl cellulose ether under conditions where the addition of benzylmercaptan to acrylamidomethyl cellulose is nearly quantitative, it is only about 20 to 35% complete with methacrylamido derivative.

EXAMPLE VI

The reaction with benzyl mercaptan described in Example II was conducted on a fabric containing N-methylacrylamidomethyl groups, with a low degree of substitution (0.025). The reaction proceeded as in the previous cases to give a benzyl sulfide cellulose derivative.

It is apparent from the preceding description that a variety of active hydrogen compounds can be made to add to the double bond of a cellulose ether containing an activated carbon to carbon double bond in a basic medium such as pyridine or aqueous alkali. When using aqueous alkali the active hydrogen compound must be a quite active one such as hydrogen sulfide or benzyl mercaptan to compete successfully against addition of free hydroxyl groups of the cellulose derivative to the olefinic double bonds of the substituents on the other cellulose hydroxyls. When the free hydroxyls add to the olefinic double bonds, a cross-linked product is obtained, as described in Example I, which exhibits a reduced solubility in cuprammonium hydroxide. Generally a crosslinked product tends to provide more durability and improved crease resistance.

When diethyl phosphite is used as the active hydrogen compound an addition to the olefinic double bond takes place as well as an ester exchange with the free hydroxyl groups of the cellulose. When using short reaction times most of the diethyl phosphite adds to the double bond; however, with longer refluxing periods, both types of reaction occur, i. e., addition to the double bond and ester exchange with free hydroxyls.

The cellulose used to form the cellulose ethers containing the activated carbon to carbon double bond and subsequently the products of the present invention may be in the form of cotton fibers, threads or woven fabric.

The cellulose ethers of the present invention exhibit improved water-repellency, flame-resistance, wrinkling and shrinking properties. The finish imparted to the cellulosic fabric is durable without any detrimental change in other fabric properties such as tensile strength, crispness, abrasion resistance and hand.

As many apparently widely different embodiments of this invention may be made without departing from the spirit and scope thereof, it is to be understood that this invention is not limited to the specific embodiments thereof except as defined in the appended claims.

What is claimed is:

1. A cellulose ether of the general type

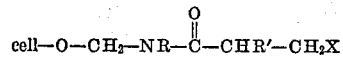

wherein R is a radical selected from the group consisting of hydrogen and lower alkyl radicals of 1 to 4 carbon atoms; R' is a radical selected from the group consisting of hydrogen and methyl radicals and X is the residue of an active hydrogen compound wherein the active hydrogen atom is linked to an atom selected from the group consisting of sulfur, nitrogen, phosphorus and oxygen and wherein the degree of substitution is between about 0.015 to 0.60.

2. A cellulose ether of the type

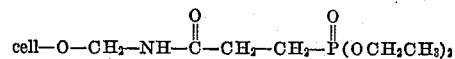

wherein the degree of substitution is between about 0.015 to 0.60.

3. A cellulose ether of the type

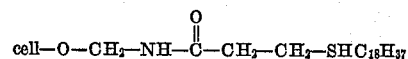

wherein the degree of substitution is between about 0.015 to 0.60.

4. A cellulose ether of the type

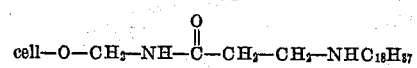

wherein the degree of substitution is between about 0.015 to 0.60.

5. A process for the preparation of cellulose ethers which comprises reacting a cellulose derivative having the general formula

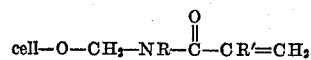

wherein R is a radical selected from the group consisting of hydrogen and lower alkyl radicals of 1 to 4 carbon atoms and R' is a radical selected from the group consisting of hydrogen and methyl radicals and wherein the degree of substitution is between about 0.015 to 0.60, with an active hydrogen compound wherein the active hydrogen atom is linked to an atom selected from the group consisting of sulfur, nitrogen, phosphorus and oxygen, in a basic medium at a temperature of about 20° C. to 120° C. and separating the cellulose ether thus produced.

6. A process for the preparation of a cellulose ether which comprises reacting a cellulose derivative having the formula

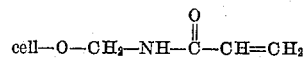

wherein the degree of substitution is between about 0.015 to 0.60 with diethyl phosphite in the presence of pyridine at a temperature of about 115° C. and separating the cellulose ether thus produced.

7. A process for the preparation of a cellulose ether which comprises reacting a cellulose derivative having the formula

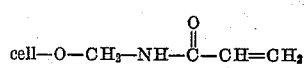

wherein the degree of substitution is between about 0.015 to 0.60 with octadecyl mercaptan in the presence of pyridine at a temperature of about 115° C. and separating the cellulose ether thus produced.

8. A process for the preparation of a cellulose ether which comprises reacting a cellulose derivative having the formula

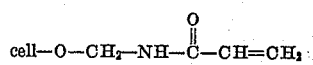

wherein the degree of substitution is between about 0.015 to 0.60 with octadecyl amine in the presence of pyridine at a temperature of about 115° C. and separating the cellulose ether thus produced.

9. A process for the preparation of a cellulose ether which comprises reacting cellulose derivatives having the formula

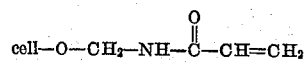

wherein the degree of substitution is between 0.015 to 0.60 with ammonia in the presence of pyridine at a temperature of about 115° C. and separating the cellulose ether thus produced.

10. A mixture of cellulose ethers comprising

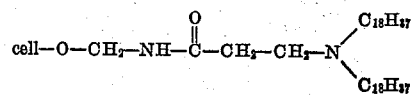

and

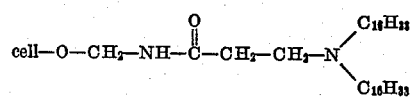

wherein the degree of substitution is between about 0.015 to 0.60.

References Cited in the file of this patent

UNITED STATES PATENTS

| | | |
|---|---|---|
| 2,317,756 | Graenacker et al. | Apr. 7, 1943 |
| 2,384,888 | Burke | Sept. 18, 1945 |
| 2,388,597 | Burke | Nov. 6, 1945 |
| 2,399,603 | Russ et al. | Apr. 30, 1946 |
| 2,455,083 | Musser | Nov. 30, 1948 |